Patented June 29, 1943

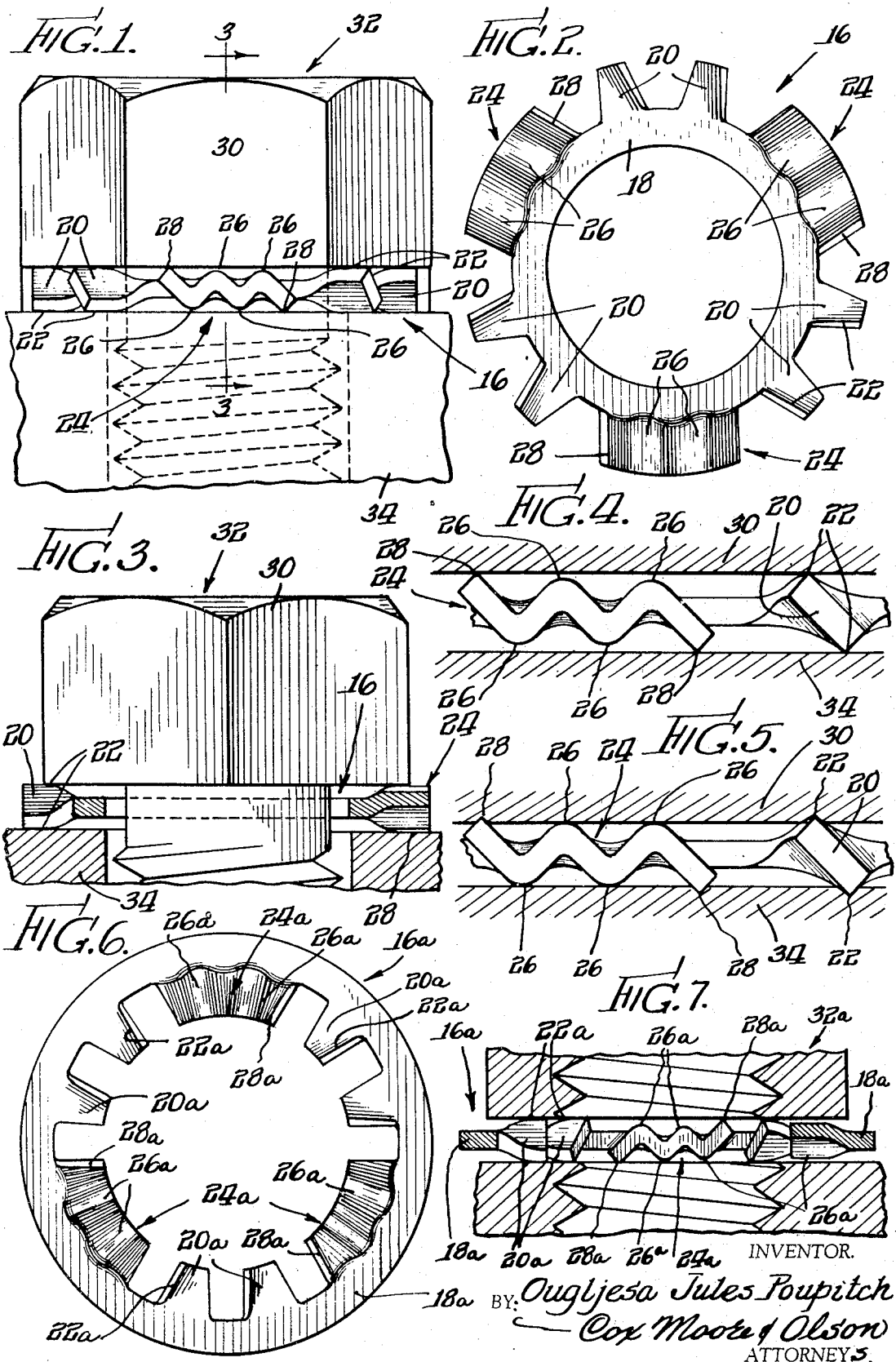

2,322,776

UNITED STATES PATENT OFFICE 2,322,776

FASTENER DEVICE

Ougljesa Jules Poupitch, Chicago, Ill., assignor to Illinois Tool Works, Chicago, Ill., a corporation of Illinois Application August 3, 1940, Serial No. 350,892

9 Claims. (Cl. 151—35)

This invention relates generally to fastener devices and more particularly to fastener devices which include lock washers of improved practical design in which complete flattening of spring washer teeth is precluded and the required degree of locking efficiency is maintained. One of the problems incident to the use of lock washers equipped with resilient locking teeth is that of preventing complete flattening of the teeth when the washer is firmly clamped against the work surface. The present invention contemplates a lock washer design which will completely obviate the aforementioned tendency for the teeth to become flattened and to this end proposes the use of specially arranged corrugations which are so positioned as to subject the washer stock to minimum stresses and strains.

More specifically, the invention contemplates a fastening device or lock washer in which corrugations are uniformly distributed over limited portions of the washer stock, marginal locking teeth being disposed circumferentially intermediate said corrugated portions and arranged so as to effectively secure a nut or screw head against loosening.

A further object of the present invention is to provide a fastener device which is equipped with a lock washer of the type equipped with either internal or external locking teeth.

Still more specifically, the invention contemplates a lock washer as specified above wherein corrugated or undulated sections of the washer stock are such as to facilitate the use of marginal locking teeth such as marginal twisted teeth.

The foregoing and numerous other objects and advantages will be apparent from the following detailed description when considered in connection with the accompanying drawing, wherein:

Fig. 1 is a side elevational view of a lock washer embodying features of the present invention, said lock washer being shown in operative association with a screw and work piece;

Fig. 2 is a plan view of the lock washer shown in Fig. 1;

Fig. 3 is a vertical sectional view taken substantially along the line 3—3 of Fig. 1;

Fig. 4 is a fragmentary enlarged side elevational view of a portion of the lock washer of Fig. 1, sectional clamping members being shown in association with the lock washer structure just prior to the final clamping thereof;

Fig. 5 discloses the lock washer structure of Fig. 4 after the clamping surfaces have been tightened thereagainst;

Fig. 6 is a plan view similar to Fig. 2 of a lock washer of the internal toothed type constructed in accordance with the teachings of the present invention; and Fig. 7 is a fragmentary central vertical sectional view of the lock washer of Fig. 6 in operative association with the work, the screw portion being removed in order to more clearly visualize the structural arrangement of the internal locking and work spacing elements.

Referring now to the drawing more in detail wherein like numerals have been used to designate similar parts throughout the various figures, one embodiment of the present invention resides in a lock washer construction as shown in Figs. 1 to 5, inclusive, said lock washer being designated generally by the numeral 16. This lock washer 16 includes an inner annular body portion 18 of flat spring stock and a plurality of locking elements 20 formed integral with and extending from the outer margin of said body 18. In the specific embodiment disclosed herein, these locking elements or members 20 are slightly tapered and twisted so as to present locking edges or teeth 22 projecting from opposite sides of the bounding planes of the body portion 18. These locking elements or prongs 20 are arranged in pairs equally distributed along the circumference or periphery of the body 18 and interposed between each of these pairs is a spacing and locking section 24.

Particular attention is directed to the structural arrangement of each of these spacing and locking sections 24. Each section is undulated or corrugated so as to present abutment surfaces 26 extending beyond the bounding planes of the washer body 18 and spaced slightly inwardly from the planes coincident with the locking teeth or edges 22. At each circumferential extremity these sections 24 present locking edges or teeth 28, said edges 28 lying in planes which include the complementary locking edges or teeth 22 of the elements or prongs 20.

It will thus be apparent that when a rotary threaded clamping fastener such as the head 30 of a screw 32, Fig. 1, is initially brought into operative association with the lock washer 16 positioned on the under side thereof and resting upon the surface of a work piece 34, the teeth 22 and 28 on the lower side of the washer bear against the clamping surface of the work piece and the teeth 22—28 on the upper side of the lock washer are engaged by the work or clamping surface of the screw head 30. The initial engagement of the clamping surface of the screw head 30 and the work piece 34 is best illustrated in the enlarged fragmentary disclosure in Fig. 4. Continued rotation of the screw head in a tightening direction causes the teeth 22—28 to firmly bite into said surface, as clearly illustrated in Fig. 5. The abutment surfaces or portions 26 of the section 24 provide a firm abutment for the opposed clamping surfaces. Any tendency to tighten the screw head 30 beyond this point is firmly resisted or opposed by the corrugations or abutments and thereby prevents complete flattening of the washer teeth.

It is to be noted that the corrugations or undulations provided in the sections 24 do not completely traverse the washer stock but extend a radial distance which is substantially equal to the radial length of the prongs or locking elements 20. Terminating the corrugations short of the internal margin of the washer enables the flat section of the annular body 18 in proximity to said sections 24 to cooperate in opposing the flattening of the corrugations or undulations in these sections. Thus the material of the flat body along the base or root of the sections 24 sets up strong resistance to any tendency for the undulations to flatten out. However, these undulations do present enough resiliency or yieldable resistance to the clamping forces exerted by the screw head so as to cooperate with the locking teeth 22—28 in securing said screw head or fastener against inadvertent loosening. It will also be apparent that by limiting the area which is undulated or corrugated to the circumferentially spaced sections 24 the annular body portion 18, which is free from distortion or disfigurement, provides a strong retaining element for the sections 24 as well as the locking elements or prongs 20. Thus, the annular body 18 being maintained in its normally flat state renders this portion of the washer stock free from deleterious strains, stresses and the like.

Thus far the invention has been described as applied to an externally toothed lock washer. The invention, however, is equally applicable to lock washers of the internally toothed type, such as the lock washers shown in Figs. 6 and 7, designated generally by the numeral 16a. The lock washer 16a is similar in structural and functional characteristics to the lock washer 16 just described, the only difference being that locking elements or teeth 20a and spacing and locking sections 24a are formed integral with and extend from the internal margin of annular body 18a. Each of the locking elements or prongs 20a present oppositely disposed locking teeth or edges 22a and each of the sections 24a present oppositely disposed locking teeth or edges 28a. Also each of the sections 24a is corrugated or undulated so as to provide firm abutment surfaces 26a circumferentially extending or positioned along the inner margin of the body 18 and normally positioned on opposite sides of the bounding planes of the washer body 18a.

It will also be noted that the undulations in each of the sections 24a extend only a partial distance across the lock washer stock and have a radial width substantially equal to the radial extent of the locking elements or prongs 20a.

By having the abutments 26a positioned along the inner margin or circumferential area of the lock washer 16a the positive engagement of the clamping surface of the threaded fastener 32a is assured. In other words, even though a portion of the outer margin of the lock washer 16a may project beyond the periphery of the threaded clamping member 32a as illustrated in Fig. 7, the abutments 24a defining the same circular area as that defined by the locking prongs 20a are always in the proper position to receive the clamping surface of the threaded fastener. The spacing and locking sections 24a have undulations or corrugations terminating short of the external margin of body 18a which present the same functional advantages referred to above in connection with the description of the sections 24. Also the locking teeth 28a, as the locking teeth 28 previously described, cooperate with the locking teeth or edges 22a in securing the threaded fastener against inadvertent retrograde movement. The description of the functional characteristics of the locking elements or prongs 20 and the sections 24, as illustrated in Figs. 4 and 5, is similar to the function characteristics of the locking elements 20a and 24a.

From the foregoing it will be apparent that the present invention contemplates a new and improved fastener device wherein a lock washer of improved practical construction is employed. The circumferentially extending or positioned abutment areas presented by the corrugations will withstand normal clamping forces without flattening, due to the steepness or acuteness of the angle forming the corrugations. Also the rounded corners which provide the abutment surfaces insure against fracture under severe tightening torque conditions. This enables the twisted locking teeth and the locking teeth located at opposite extremities of the spacing sections to retain practically the full angle to which they were formed and thus allow said teeth to lock at an intended angle without being deformed or stressed beyond their elastic limit. By having the washer stock corrugated or axially deflected as described herein, maximum locking efficiency is obtained without subjecting the washer stock to deleterious stresses or strains.

While certain structural features have been disclosed herein for the purpose of illustrating embodiments of the invention contemplated hereby, it will be apparent that changes may be made in the structural arrangement of the illustrated parts without departing from the spirit and scope of the appended claims.

The invention is hereby claimed as follows:

1. A fastener device including a lock washer having an annularly disposed body portion of spring stock, a plurality of resilient locking elements extending from a margin of said body portion and providing teeth normally projecting in opposite directions beyond the bounding planes of said body to lockingly engage opposed clamping surfaces when the washer is clampingly engaged therebetween, and alternately deflected sections of washer stock presenting work spacing portions of limited circumferential extent interposed between certain of said teeth, said spacing portions providing abutments projecting outwardly beyond the bounding planes of the body adapted to be engaged by opposed clamping surfaces so as to prevent flattening of the locking elements.

2. A fastener device including a lock wash having an annularly disposed body portion of spring stock, a plurality of resilient locking elements extending from a margin of said body portion, each locking element presenting teeth normally projecting in opposite directions beyond the bounding planes of said body to lockingly engage opposed clamping surfaces when the washer is clampingly engaged therebetween, and alternately deflected sections of washer stock presenting work spacing portions of limited circumferential extent interposed between certain of said teeth, said spacing portions providing abutments projecting outwardly beyond the bounding planes of the body adapted to be engaged by opposed clamping surfaces so as to prevent flattening of the locking elements.

3. A fastener device including a lock washer having an annularly disposed body portion of spring stock, a plurality of resilient locking elements extending from a margin of said body portion, each of said resilient locking elements being deflected with respect to the body portion so as to provide radial edges normally projecting in opposite directions beyond the bounding planes of said body to lockingly engage and make a line bite within opposed clamping surfaces when the washer is clampingly engaged therebetween, and alternately deflecting sections of washer stock presenting work spacing portions of limited circumferential extent interposed between certain of said teeth, said spacing portions providing abutments projecting outwardly beyond the bounding planes of the body adapted to be engaged by opposed clamping surfaces so as to prevent flattening of the locking elements.

4. A fastener device including a lock washer having an annularly disposed body portion of spring stock, a plurality of resilient locking elements extending from a margin of said body portion and providing teeth normally projecting in opposite directions beyond the bounding planes of said body to lockingly engage opposed clamping surfaces when the washer is clampingly engaged therebetween, and alternately deflected sections of washer stock presenting work spacing portions of limited circumferential extent interposed between certain of said teeth, said spacing portions providing abutments projecting outwardly beyond the bounding planes of the body adapted to be engaged by opposed clamping surfaces so as to prevent flattening of the locking elements, said spacing portions having a radial width which is less than the over-all radial width of the washer stock.

5. A fastener device including a lock washer having a flat annularly disposed body portion of spring stock, a plurality of resilient locking elements extending from a margin of said body portion and providing teeth normally projecting in opposite directions beyond the bounding planes of said body to lockingly engage opposed clamping surfaces when the washer is clampingly engaged therebetween, and alternately deflected sections of washer stock positioned radially beyond said flat body portion and presenting work spacing portions of limited circumferential extent interposed between certain of said teeth, said spacing portions providing abutments projecting outwardly beyond the bounding planes of the body adapted to be engaged by opposed clamping surfaces so as to prevent flattening of the locking elements.

6. A fastener device as defined by claim 1, wherein the locking elements extend from the external margin of said body portion.

7. A fastener device as defined by claim 1, wherein the locking elements extend from the internal margin of said body portion.

8. A fastener device including a lock washer having an annularly disposed body portion of spring stock, a plurality of resilient locking elements extending from a margin of said body portion and providing teeth normally projecting in opposite directions beyond the bounding planes of said body to lockingly engage opposed clamping surfaces when the washer is clampingly engaged therebetween, and alternately deflected sections of washer stock presenting work spacing and locking portions of limited circumferential extent interposed between certain of said teeth, said spacing and locking portions providing abutments projecting outwardly beyond the bounding planes of the body adapted to be engaged by opposed clamping surfaces so as to prevent flattening of the locking elements, and also providing locking teeth adapted to be engaged by said opposed clamping surfaces.

9. A fastener device including a lock washer having an annularly disposed body portion of spring stock, a plurality of resilient locking elements extending from a margin of said body portion, each locking element presenting teeth normally projecting in opposite directions beyond the bounding planes of said body to lockingly engage opposed clamping surfaces when the washer is clampingly engaged therebetween, and alternately deflected sections of washer stock presenting work spacing and locking portions of limited circumferential extent interposed between certain of said teeth, said spacing and locking portions providing abutments projecting outwardly beyond the bounding planes of the body adapted to be engaged by opposed clamping surfaces so as to prevent flattening of the locking elements, and also providing locking teeth adapted to be engaged by said opposed clamping surfaces.

OUGLJESA JULES POUPITCH.

CERTIFICATE OF CORRECTION.

Patent No. 2,322,776. June 29, 1943.

OUGLJESA JULES POUPITCH.

It is hereby certified that error appears in the printed specification of the above numbered patent requiring correction as follows: Page 2, first column, line 5, for "surface" read --surfaces--; page 2, second column, line 18, for "function" read --functional--; page 3, first column, line 20, claim 3, for "deflecting" read --deflected--; and that the said Letters Patent should be read with this correction therein that the same may conform to the record of the case in the Patent Office.

Signed and sealed this 30th day of November, A. D. 1943.

(Seal)

Henry Van Arsdale,
Acting Commissioner of Patents.